United States Patent [19]

Liou

[11] Patent Number: 5,607,750

[45] Date of Patent: Mar. 4, 1997

[54] AUTOMOBILE MAT

[76] Inventor: Yaw-Tyng Liou, P. O. Box 82-144, Taipei City, Taiwan

[21] Appl. No.: 593,708

[22] Filed: Jan. 29, 1996

[51] Int. Cl.$^6$ ............................... B32B 3/00; B62D 25/20
[52] U.S. Cl. ........................ 428/172; 428/137; 428/138; 428/156; 5/417; 296/97.23
[58] Field of Search ............................. 428/72, 131, 138, 428/141, 156, 172, 167, 178, 192; 5/417, 420; 296/38, 97.23

[56] References Cited

U.S. PATENT DOCUMENTS 3,561,177  2/1971  Agro et al. ............................. 428/178
5,190,799  3/1993  Ellingson ............................... 428/167
5,350,619  9/1994  Rasmussen ............................ 428/167
5,374,466  12/1994  Bleasdale ............................. 428/137

Primary Examiner—Donald Loney
Attorney, Agent, or Firm—Alfred Lei

[57] ABSTRACT

An automobile mat including an upper layer formed with a plurality of arrow-shaped recesses and diamond-shaped recesses arranged alternately and extending obliquely and downwardly through the upper layer to form a larger open top, and a lower layer attached to a bottom of the upper layer, whereby the mat can prevent the automobile occupant's shoes from slipping and collect the sand and dirt from the automobile occupant's shoes.

1 Claim, 4 Drawing Sheets

AUTOMOBILE MAT

BACKGROUND OF THE INVENTION

1. Field of the Invention

This invention relates to an improved automobile mat.

2. Description of the Prior Art

It has been found that the conventional automobile mat is simply made of a solid plastic sheet with a plurality of plastic piles thereon. However, such an automobile mat is only designed for removing the sand and dirt from the automobile occupant's shoes, but cannot be used for collecting the sand and dirt therefrom. Accordingly, the sand and dirts will be scattered everywhere in the automobile. In addition, it is difficult and inconvenient to clean such an automobile mat.

Therefore, it is an object of the present invention to provide an automobile mat which can obviate and mitigate the above-mentioned drawbacks.

SUMMARY OF THE INVENTION

This invention is directed to an improved automobile mat.

It is the primary object of the present invention to provide an automobile mat which can prevent the automobile occupant's shoes from slipping.

It is another object of the present invention to provide an automobile mat which can collect the sand and dirt from the automobile occupant's shoes.

It is still another object of the present invention to provide an automobile mat which is simple in construction.

It is still another object of the present invention to provide an automobile mat which is fit for mass production.

It is a further object of the present invention to provide an automobile mat which is low in cost.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
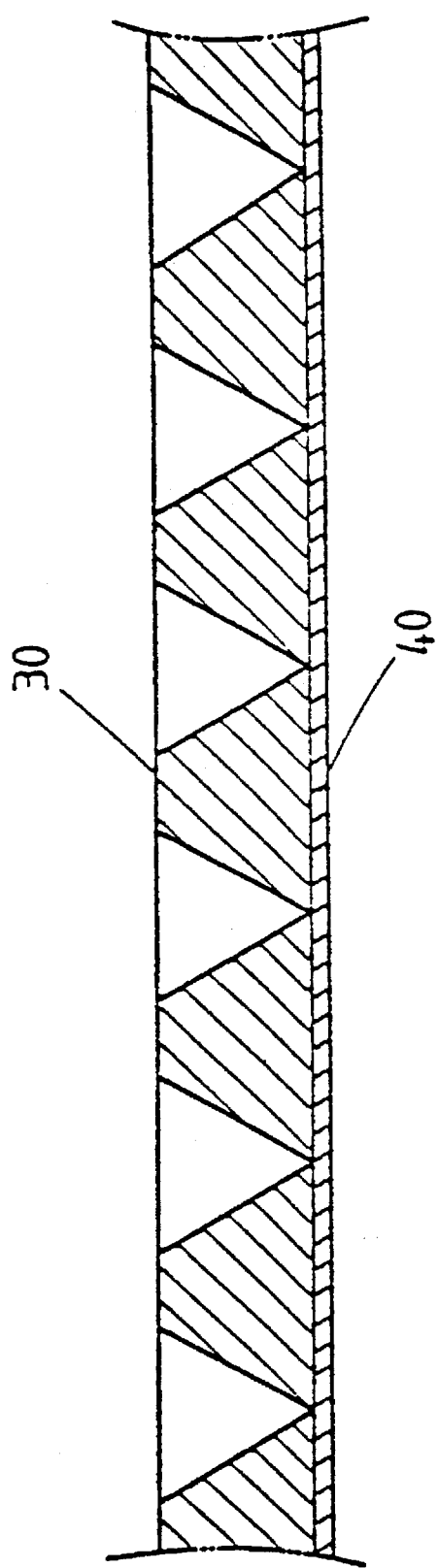
FIG. 1 is a sectional view of the present invention.
Figure 2:
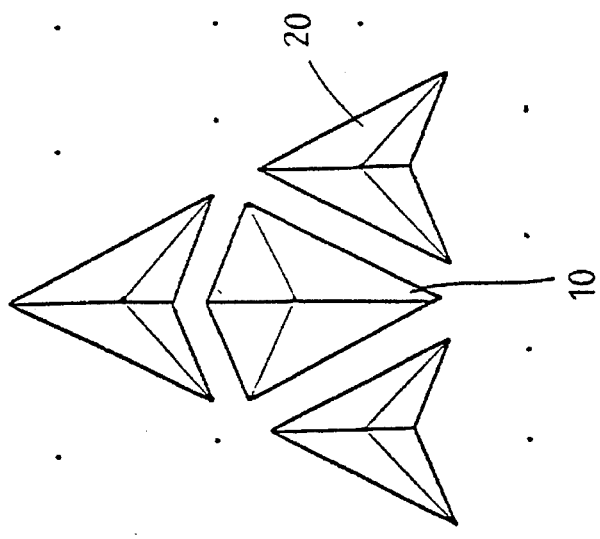
FIG. 2 is a top view of the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the automobile mat according to the present invention mainly comprises an upper layer 30 and a lower layer 40.

The upper layer 30 is preferably made of foamed material such as EVA, PU or the like. The upper layer 30 is formed with a plurality of arrow-shaped recesses 20 and diamond-shaped recesses 10 arranged alternately and extending obliquely and downwardly through the upper layer to form a larger open top. The diamond-shaped recess 10 includes an open top which is quadrilateral in shape having two adjacent long sides and two adjacent short sides, wherein the two long sides makes an acute angle, while the two short sides an obtuse angle. Furthermore, the four sides of the open top of the diamond-shaped recess 10 are convergent downwardly through the upper layer 30 to a point. The arrow-shaped recess 20 also has an open top which is quadrilateral in shape having two adjacent long sides and two adjacent short sides, wherein the two long sides makes an acute angle and the two short sides an angle greater than 180 degrees. In addition, the four sides of the open top of the arrow-shaped recesses 20 extend obliquely and downwardly through the upper layer 30 to meet at a point.

The lower layer 40 is attached to the bottom of the upper layer 30 and is preferably made of water-proof material.

Figure 3:
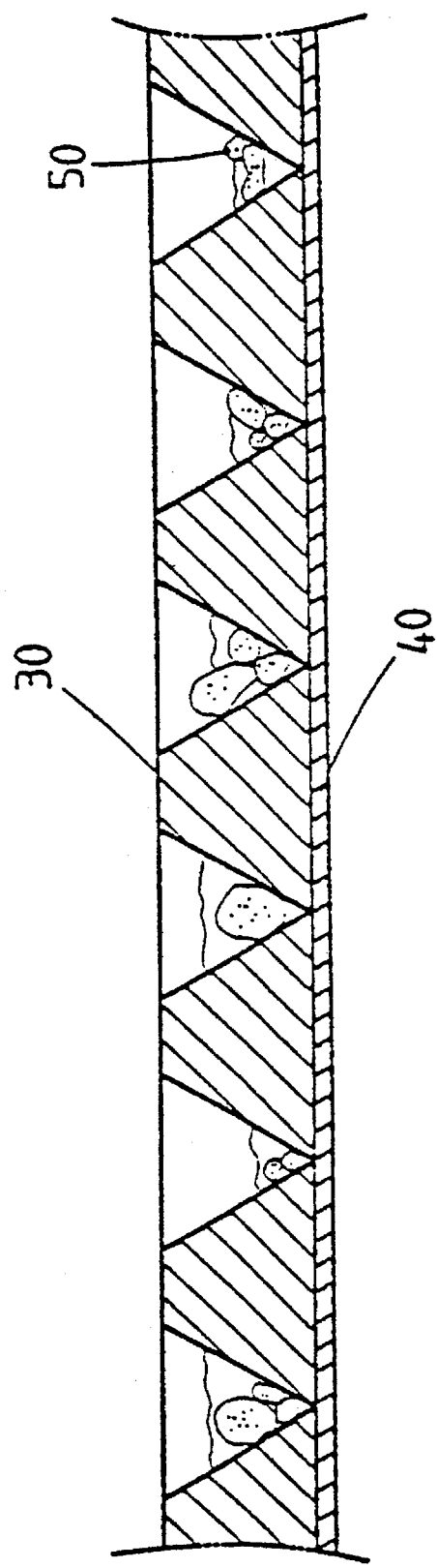
FIG. 3 is a sectional view illustrating the working principle of the present invention.

FIG. 3 illustrates a working view of the automobile mat according to the present invention. As illustrated, the present invention can collect the sand and dirt 50 from the shoes of the automobile occupants thereby keeping the top of the upper layer clean. Furthermore, the diamond-shaped recesses 10 and the arrow-shaped recesses 20 may effectively prevent the shoe from slipping.

Figure 4:
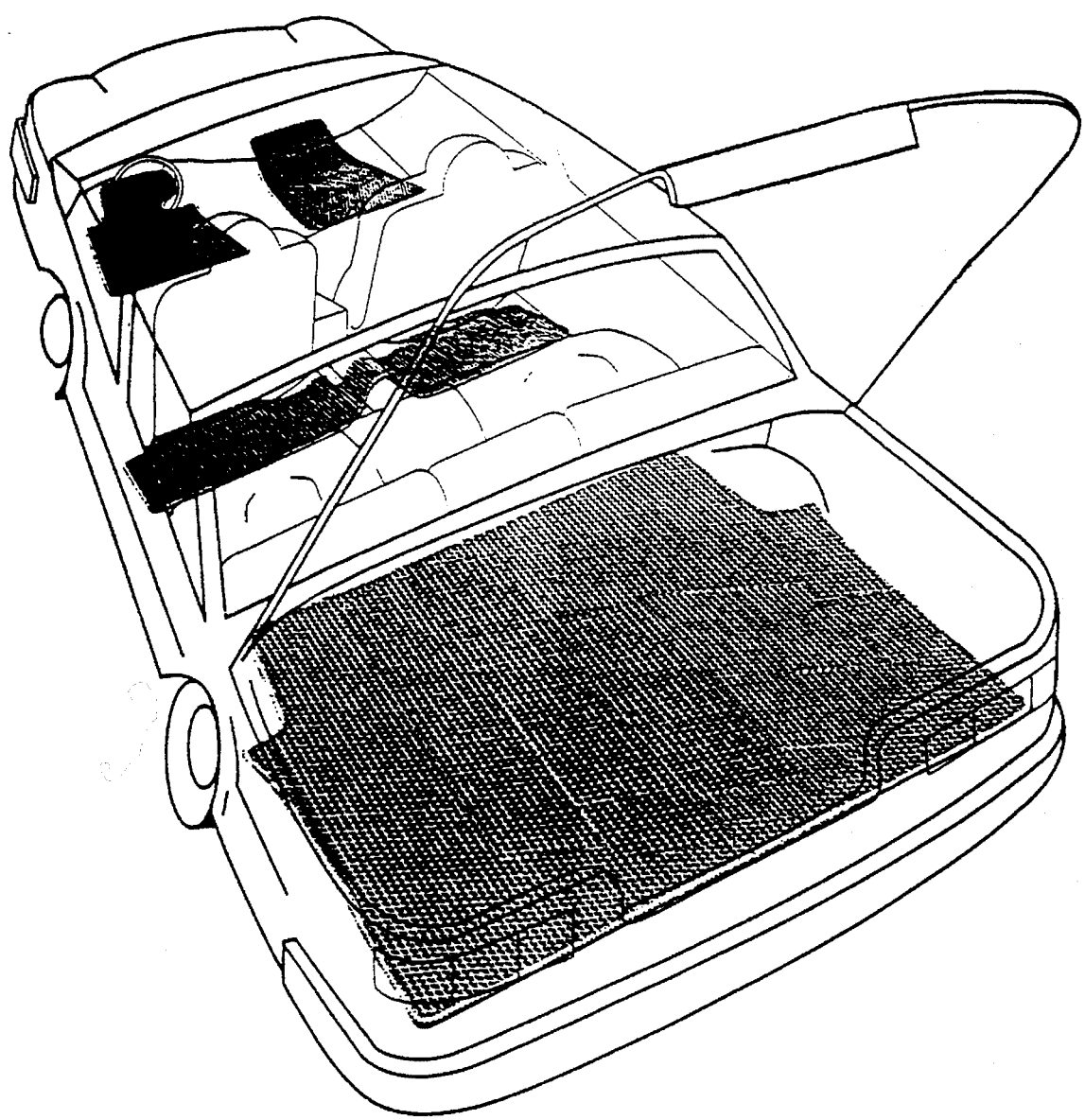
FIG. 4 illustrates different applications of the present invention.

FIG. 4 illustrates different applications of the present invention. As shown, the present invention can be used as an automobile mat or a mattress for surfacing the inner side of the trunk.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An automobile mat comprising:

an upper layer formed with a plurality of arrow-shaped recesses and diamond-shaped recesses arranged alternately and extending obliquely and downwardly through said upper layer to form a larger open top; and a lower layer attached to a bottom of said upper layer.

* * * * *